United States Patent Office 3,084,705
Patented Apr. 9, 1963

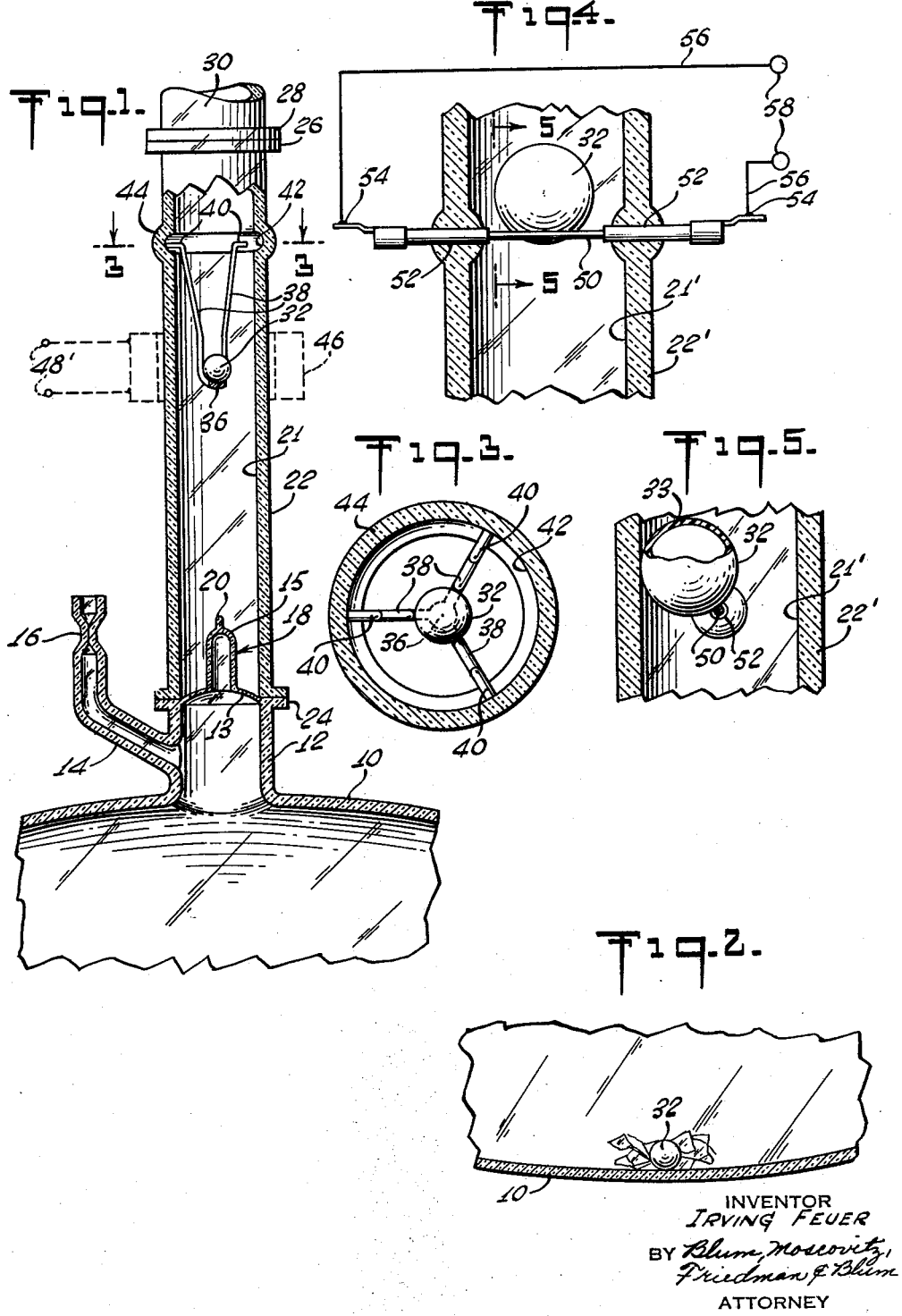

3,084,705
DEVICE FOR RUPTURING GLASS SEALS
Irving Feuer, New York, N.Y., assignor to Canrad Precision Industries, New York, N.Y., a corporation of New York
Filed Mar. 13, 1961, Ser. No. 95,360
3 Claims. (Cl. 137—68)

This invention relates generally to a device and technique for rupturing glass seals and, more particularly, to a device for rupturing glass seals of a sealed container of an ultra-pure gas.

In the art of rupturing seals in an ultra-pure gas system, glass enclosed magnets or magnetic materials have heretofore been used by burdensome and time-consuming manipulation thereof into an elevated position with respect to the seal and at best, this task is inherently difficult and inconvenient and such difficulty is compounded by the requirement that such magnet be installed and manipulated in an evacuated gas sealed system. The gas system associated with the pure gas source must be evacuated and only on evacuation is the glass seal ruptured and the heretofore used rupturing arrangement has been characterized by the use of such glass encased magnets, magnetic materials or metals which must be manipulated into position in the sealed system.

It is accordingly an important aim and object of the present invention to provide a rupturing arrangement which obviates the disadvantages aforenoted and provides a convenient, efficient and foolproof arrangement for rupturing such glass seals. Pursuant to this object of the present invention, the rupturing device may be an integral component of the ultra-pure gas container which may be safely transported and stored, this arrangement being, in effect, a self-contained system which includes its own rupturing device. Optionally, the rupturing device may be supplied as a separate component which is integrated with the ultra-pure gas container by the glass blower at the point of use. In accordance with the present invention there is provided a rupturing element supported in elevated position with respect to the glass seal by a fusible support which is melted to release such element for gravitation into impact with the seal.

Another object of the present invention is the provision of a rupturing device or system of the aforenoted character which is inherently safe and convenient in use and which minimizes the dangers of gas contamination inherent in the use of prior art techniques.

Yet another object of the present invention is the provision of a rupturing device or system which is completely self-contained and provides for the facile and quick evacuation of the system and rupturing of the glass seal of the gas container to thereby improve and speed up laboratory techniques involving ultra-pure gas systems.

Other objects, features and advantages of the present invention will become apparent as the description thereof proceeds when considered in connection with the accompanying illustrative drawing in which:

FIG. 1 is an enlarged fragmentary front elevational view, shown partly in section, illustrating the rupturing device of the present invention, the glass seal of the container being shown intact;

FIG. 2 is a view corresponding to the lower portion of FIG. 1 after rupture of the glass seal;

FIG. 3 is a sectional view, on an enlarged scale, taken on the line 3—3 of FIG. 1;

FIG. 4 is an enlarged fragmentary sectional view of another embodiment of rupturing device in accordance with the present invention; and FIG. 5 is a vertical sectional view taken on the line 5—5 of FIG. 4.

Referring to the drawing, and more particularly to FIGS. 1 and 2 thereof, there is shown a sealed flask or container 10 formed of glass which may contain any desired gas such as ultra-pure argon, krypton, neon, etc. The sealed container 10 of ultra-pure gas includes an upstanding neck conduit 12 having a branch conduit 14 extending therefrom and communicating therewith, said branch conduit being used for the initial filling of the container 10 and being sealed at its entrance region 16 by the usual glass blowing techniques. Prior to filling the container 10, the supply conduit 14 defines a through passage and after the filling operation the supply conduit is choked off and sealed at 16 by pinching the adjacent walls into sealing engagement with the glass in a molten state. The neck of the container is sealed by glass seal 18 which is integral with the walls of neck 12, the glass seal having a diaphragm 13 and a central, hollow, elongated formation 15 having a terminal part 20 which is formed by pinching the walls of formation 15 in a molten condition as well known to those skilled in the art. The glass seal 18 is, in effect, a frangible sealing diaphragm and in use the gas sealed in container 10 is released by rupturing the glass seal so as to define an outlet therefor. The flask 10 having branch filling conduit 14 and glass seal 18 is basically conventional, the invention herein residing in the rupturing device and technique for breaking the glass seal 18 as will now be described in detail.

Secured to the neck defining conduit and upstanding therefrom is a conduit 22 of a corresponding diameter, said conduit 22 being sealed to the neck 12 by a flange connection as indicated at 24, the flange connection being achieved by any well known glass blowing technique. It will be understood that conduit 22 may be secured to neck 12 in sealing relation therewith by any desired type of connection and the adjacent peripheral edges of conduit 22 and neck 12 may be secured directly to each other without the use of flanges thereat. The upper end of conduit 22 is provided with a peripheral flange or collar 26 which is sealed to a companion flange 28 of conduit 30, the latter communicating with the gas system. Thus the conduit 30 may form a part of a supply manifold for any desired gas utilization system.

Pursuant to the present invention there is provided a rupturing element 32 which is supported in elevated position in the conduit 22 with respect to the glass seal 18 by a fusible support 34 to be described in detail hereinafter which is melted to release such element for gravitation into impact with the seal. The element 32 may be any suitable weighted element and in the illustrated embodiment said element is of spherical configuration and is sealed in a coating of Teflon or glass, the element being formed of a suitable metallic material such as steel. The spherical element 32 is supported in the channel 21 defined by the conduit 22 by means of the support 34 which is formed of glass, said support having a lowermost shelf 36 upon which the element 32 is seated and captured in position. The shelf 36 is suspended from the glass legs 38 which are equiangularly spaced in the channel 22 and terminate in flanges 40 which engage in the peripheral groove 42 defined by the peripheral bead 44 of the conduit 22. Thus the legs 38 arranged in inverted tripod disposition and suspend the shelf 36 in the channel 21 with the element 32 being supported on said shelf. The legs 38 are of elongated filamentary construction and are of relatively fine cross section so as to be readily melted on the application of the requisite amount of heat applied inductively thereto to permit the element 32 to gravitate down the channel.

In practice, the conduits 22 and 30 and the gas system in communication therewith will be evacuated in any well-known manner and subsequent to system evacuation, the fusible support 34 is heated on energization of the induction heater 46 so as to release the element 32 from support and free the same for gravitation down the conduit 22 and into impact with the seal 18 for rupturing the same, the condition of rupture being illustrated in FIG. 2. As shown in FIG. 1, the induction heater, which may be of any conventional type, extends peripherally of the conduit 22 in the region of element 32 and on the application of an electric current to the terminals 48' of the induction heater the spherical element 32 is correspondingly heated by induction and the heat thereof is transmitted to the adjacent porions of legs 38 until such portions are melted to release element 32. In this regard it will be understood that any suitable heating suorce may be utilized for melting the support 34 in order to release the element 32 for gravitation, the specific induction heater 46 illustrated and described being given by way of example only. It will be understood that the weighted element 32 is captured in position by the support 34 whereby to provide a self-contained system including its own rupturing device so that in use it is merely necessary to evacuate the system and melt the fusible support 34 to release the rupturing element 32. The conduit 22 and the glass seal rupturing device may be supplied as an integral part of the container 10, or if desired, may be supplied as a separate component which is integrated with the container 10 at the point of use by well-known glass blowing technique. The container 10 having such glass seal rupturing device may be transported and stored with safety in view of the captured disposition of rupturing element 32 by the support 34. It will be understood that on seal rupture the element 32 and the fragmentary portions of the ruptured glass seal will lie at the bottom or at the site of breakage of the container 10, as shown in FIG. 2, and the gas of the container will be released for flow through the conduits 22 and 30 and into the system in communication therewith. It will be understood that it is only necessary to rupture the seal which is accomplished by the gravitation of element 34, which may remain at the now ruptured seal or drop to the bottom of the container.

With reference to FIGS. 4 and 5, there is shown another embodiment of the present invention in which the conduit 22' may be a separate attachment component for the container 10 or may be supplied as an integral unit with said container. In order to support the element 32 in elevated position in the channel 21' defined by the conduit 22' there is provided a fusible support element 50 which is suitably anchored to the conduit 22' and extends transversely of the internal channel 21' substantially along the diametrical axis thereof. The element 32 of this embodiment is preferably sealed in glass 33 and is of a diameter greater than one-half the diameter of the channel 21'. The support element 50 is formed of a suitable fusible metal, such as Wood's Metal, and in the instant embodiment is shown of elongated filamentary or wire-like construction, of relatively fine cross section, said element normally supporting the element 32 in elevated position, as shown in FIG. 4, and being adapted to be melted in order to release the element 32 for gravitation down the channel into impact with the seal 18 in the manner previously described. Since the fusible support 50 is not suitable for direct sealing to the glass walls of the channel 22', the opposite ends of the support element 50 are secured, as by welding, to adjacent ends of the tungsten inserts 52 which extend through such glass walls and are sealed thereto, as shown in FIG. 4. Thus the fusible element 50 is supported in position in the channel 21' by means of the tungsten anchoring elements or inserts 52 which are sealed to wall portions of conduit 22'. The anchoring elements 52 are provided with terminals 54 external of the conduit and in circuit with conductors 56 having terminals 58. A suitable source of current is adapted to be connected across the terminals 58 to provide for the flow of an electric current through the fusible element 50 for melting the latter and releasing the element 32 for gravitation down the channel into impact with the seal 18. In this regard it will be understood that any desired heating source may be utilized for melting the fusible support 50 for the release of element 32, the specific arrangement shown and described herein being given by way of example only. As shown in FIG. 5, the element 32 is of a diameter slightly greater than one-half the diameter of the channel 21', and is supported in position by the walls of conduit 22' in conjunction with the fusible support 50.

From the above it will be apparent that the above-described seal rupturing devices are completely self-contained and safely provide for the facile and rapid evacuation of the system and rupture of the glass seal to thereby greatly improve and expedite laboratory techniques involving the use of ultra-pure gas.

While specific embodiments of the invention have been shown and described in detail to illustrate the application of the principles of the invention, it will be understood that the invention may be embodied otherwise without departing from such principles, and that the invention should be broadly construed in accordance with such principles.

Having thus described my invention, what I claim and desire to secure by Letters Patent is:

1. A glass conduit having a glass seal interposed therein, and means for rupturing said glass seal comprising a weighted rupturing element elevated from said glass seal, means for supporting said element in said elevated position comprising a fusible support secured to the walls of said conduit, said element being releasable from said support by an externally disposed induction heater operative to melt said support and thereby free said element for gravitational movement down said conduit into impact with said seal for rupturing the same, said conduit upstanding from a sealed container of ultra-pure gas, said support being formed of glass and having plural legs for supporting said rupturing element in suspended relation in said conduit, the latter having a formation engageable with said support for supporting the latter in said conduit.

2. A glass conduit having a glass seal interposed therein, and means for rupturing said glass seal comprising a weighted rupturing element elevated from said glass seal, means for supporting said element in said elevated position comprising a fusible support secured to the walls of said conduit, said element being releasable from said support by an externally disposed induction heater operative to melt said support and thereby free said element for gravitational movement down said conduit into impact with said seal for rupturing the same, said support being formed of glass and having supporting sections of relatively small cross section, said element comprising a metallic body whereby said heater is operative to heat said body to transmit the heat thereof to said sections and melt the same.

3. A glass conduit having a glass seal interposed therein, and means for rupturing said glass seal comprising a weighted rupturing element elevated from said glass seal, means for supporting said element in said elevated position comprising a fusible support secured to the walls of said conduit, said support being formed of glass and having supporting sections of relatively small cross section, said element comprising a metallic body operative to transmit heat to said sections for melting the same, and an induction heater positioned externally of said conduit in the region of said support for melting said support by heating the element for transmission of heat to the support, whereby to free said element for gravitational movement down said conduit into impact with said seal to rupture the same.

(References on following page)

References Cited in the file of this patent

UNITED STATES PATENTS

| | | |
|---|---|---|
| 824,935 | Jenczewsky | July 3, 1906 |
| 1,510,813 | Williams | Oct. 7, 1924 |
| 2,128,292 | Finn | Aug. 30, 1938 |
| 2,419,112 | Brandt | Apr. 15, 1947 |
| 2,619,116 | Ralston | Nov. 25, 1952 |
| 2,668,412 | Abramson | Feb. 9, 1954 |

FOREIGN PATENTS

| | | |
|---|---|---|
| 744,858 | Great Britain | Feb. 15, 1956 |